US007992091B2

(12) United States Patent
Bolger et al.

(10) Patent No.: US 7,992,091 B2
(45) Date of Patent: Aug. 2, 2011

(54) MESSAGE-ORIENTED DIVERGENCE AND CONVERGENCE OF MESSAGE DOCUMENTS

(75) Inventors: Timothy Sean Bolger, Vallejo, CA (US); Anirudh Yadav, San Ramon, CA (US); Terry Lynn Jensen, Danville, CA (US); Robert Henry Mizote, Dublin, CA (US); Michael John Hicks, Newark, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 586 days.

(21) Appl. No.: 11/393,994

(22) Filed: Mar. 30, 2006

(65) Prior Publication Data

US 2007/0239765 A1    Oct. 11, 2007

(51) Int. Cl.
*G06F 17/00* (2006.01)
*G06F 15/00* (2006.01)
*G06F 17/24* (2006.01)
*G06F 17/21* (2006.01)
*G06F 17/30* (2006.01)

(52) U.S. Cl. ........ 715/760; 715/210; 715/255; 715/234; 707/E17.012

(58) Field of Classification Search .................. 715/760, 715/210, 255, 234; 707/E17.012
See application file for complete search history.

(56) References Cited

U.S. PATENT DOCUMENTS

| | | | |
|---|---|---|---|
| 5,790,848 A * | 8/1998 | Wlaschin | 707/201 |
| 5,845,293 A * | 12/1998 | Veghte et al. | 707/202 |
| 5,890,177 A * | 3/1999 | Moody et al. | 715/210 |
| 6,226,652 B1 * | 5/2001 | Percival et al. | 715/840 |
| 6,507,865 B1 | 1/2003 | Hanson et al. | |
| 6,687,878 B1 | 2/2004 | Eintracht et al. | |
| 6,772,165 B2 * | 8/2004 | O'Carroll | 715/203 |
| 6,848,078 B1 | 1/2005 | Birsan et al. | |
| 6,931,592 B1 | 8/2005 | Ramaley et al. | |
| 7,117,216 B2 * | 10/2006 | Chakraborty et al. | 707/E17.012 |
| 7,185,277 B1 * | 2/2007 | Bernstein et al. | 715/210 |
| 7,231,394 B2 * | 6/2007 | Walker et al. | 707/E17.011 |
| 2002/0123891 A1 | 9/2002 | Epstein | |
| 2002/0169740 A1 | 11/2002 | Korn | |
| 2003/0041095 A1 | 2/2003 | Konda et al. | |
| 2003/0125090 A1 | 7/2003 | Zeira | |
| 2003/0126089 A1 | 7/2003 | Fukuoka et al. | |
| 2004/0044492 A1 | 3/2004 | Ichikawa | |

(Continued)

OTHER PUBLICATIONS

Guangjun Wu et al., Design and Implementation of Multi-Version Disk Backup Data Merging Algorithm, 2008 Web-Age Information Management, WAIM '08. The Ninth International Conference on (978-0-7695-3185-4), p. 531-531.*

(Continued)

*Primary Examiner* — William L Bashore
*Assistant Examiner* — Jordany Nunez
(74) *Attorney, Agent, or Firm* — Toler Law Group (57) ABSTRACT

A computing device comprises a memory to store a first version of an eXtensible Markup Language (XML) message, a receiver to receive a second version of the XML message, a processor and a display interface. The display interface provides a user interface having a first control, a second control and a third control. The first control is to cause the processor to merge the second version with the first version to produce a third version of the XML message. The second control is to cause the processor to replace in the memory the first version with the second version of the XML message. The third control is to cause the processor to reject the second version of the XML message.

19 Claims, 6 Drawing Sheets

U.S. PATENT DOCUMENTS

| | | |
|---|---|---|
| 2004/0078444 A1 | 4/2004 | Malik |
| 2004/0085355 A1 | 5/2004 | Harmes et al. |
| 2004/0117404 A1 | 6/2004 | Crivella et al. |
| 2004/0205539 A1 | 10/2004 | Mak et al. |
| 2004/0221323 A1 | 11/2004 | Watt |
| 2004/0230886 A1 | 11/2004 | Livshits |
| 2005/0120108 A1 | 6/2005 | Wisniewski et al. |
| 2005/0149621 A1 | 7/2005 | Kirkland et al. |

OTHER PUBLICATIONS

Aref et al., Incremental, online, and merge mining of partial periodic patterns in time-series databases, 2004, Knowledge and Data Engineering, IEEE Transactions on (1041-4347). vol. 16,Iss.3;p. 342-342.*

* cited by examiner

MESSAGE-ORIENTED DIVERGENCE AND CONVERGENCE OF MESSAGE DOCUMENTS

FIELD OF THE DISCLOSURE

The present disclosure is generally related to methods and systems to merge versions of computer-readable data.

BACKGROUND

Using existing versioning software, multiple parties can download files from a central repository, build a local repository, make changes such as additions and subtractions to the local repository, upload the changes to the central repository, and apply the differences on the central repository to files in the local repository. The technology is based on a file system and allows for changes to be made on a file. The determination for making changes is based on differences that are found in the text. A text comparison, such as a diff utility in Unix, is used to find differences in the text.

Examples of existing versioning software include CVS and SUBVERSION.

DETAILED DESCRIPTION OF THE DRAWINGS

Disclosed herein are embodiments of performing N-way message-based divergence and convergence of message documents (MDs). The MDs comprise messages such as XML messages rather than files. Users can create MDs based upon an abstraction of their choosing. The MDs are distributed and modified by the users in a peer-to-peer manner. The users can modify the MDs by any combination of adding new items, editing and/or moving existing items, and/or removing existing items. This results in multiple, divergent versions being produced. Mutually compatible versions of the MD can be combined into a new MD to converge the MD to an abstract model. Multiple acts of modifying and merging can be performed to produce variants of the MDs that diverge and converge in parallel.

Embodiments can be used in various software applications. Some embodiments are used in a merge or update feature of a link messenger application.

Figure 1:
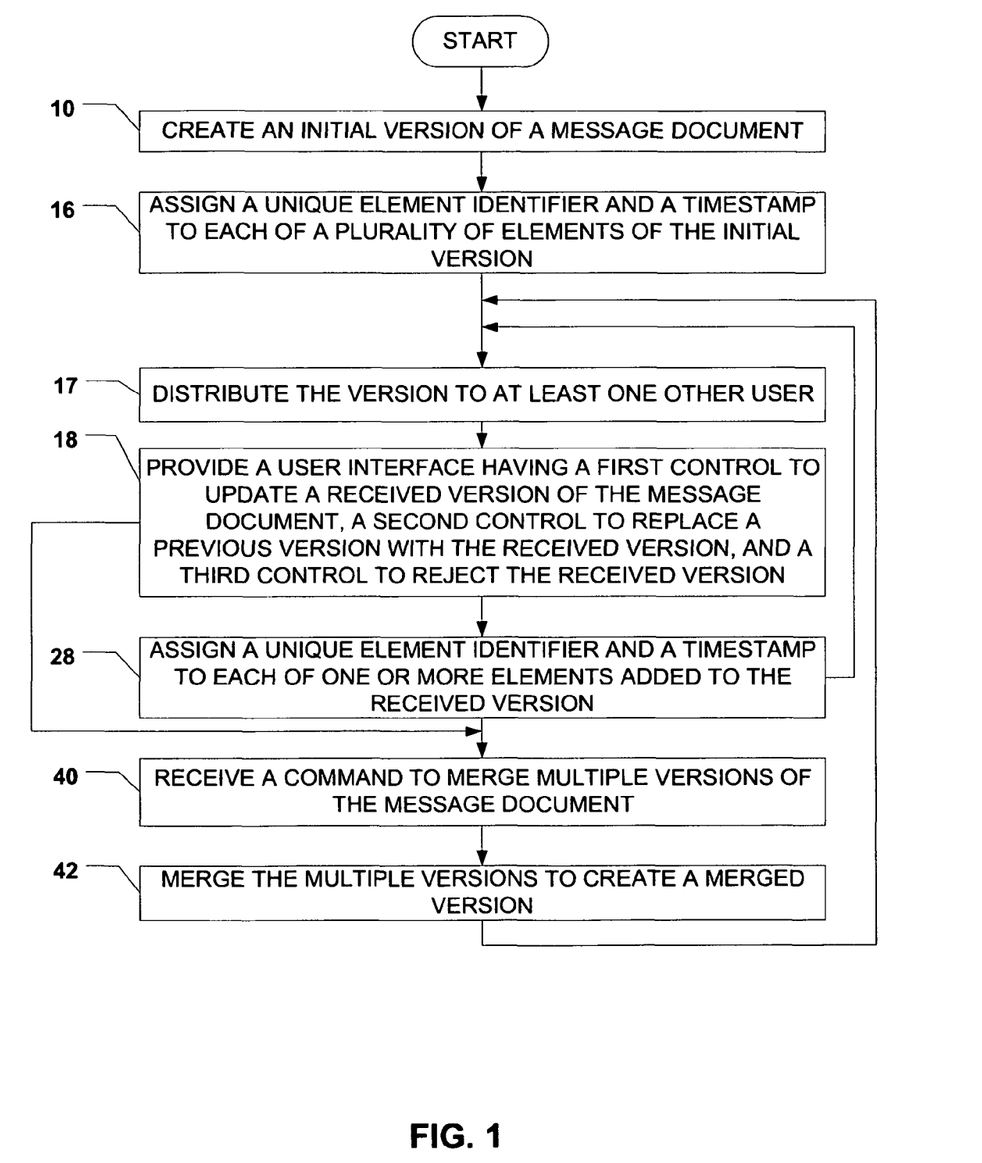
FIG. 1 is a flow chart of an embodiment of a method of performing N-way message-based divergence and convergence of message documents.
Figure 2:
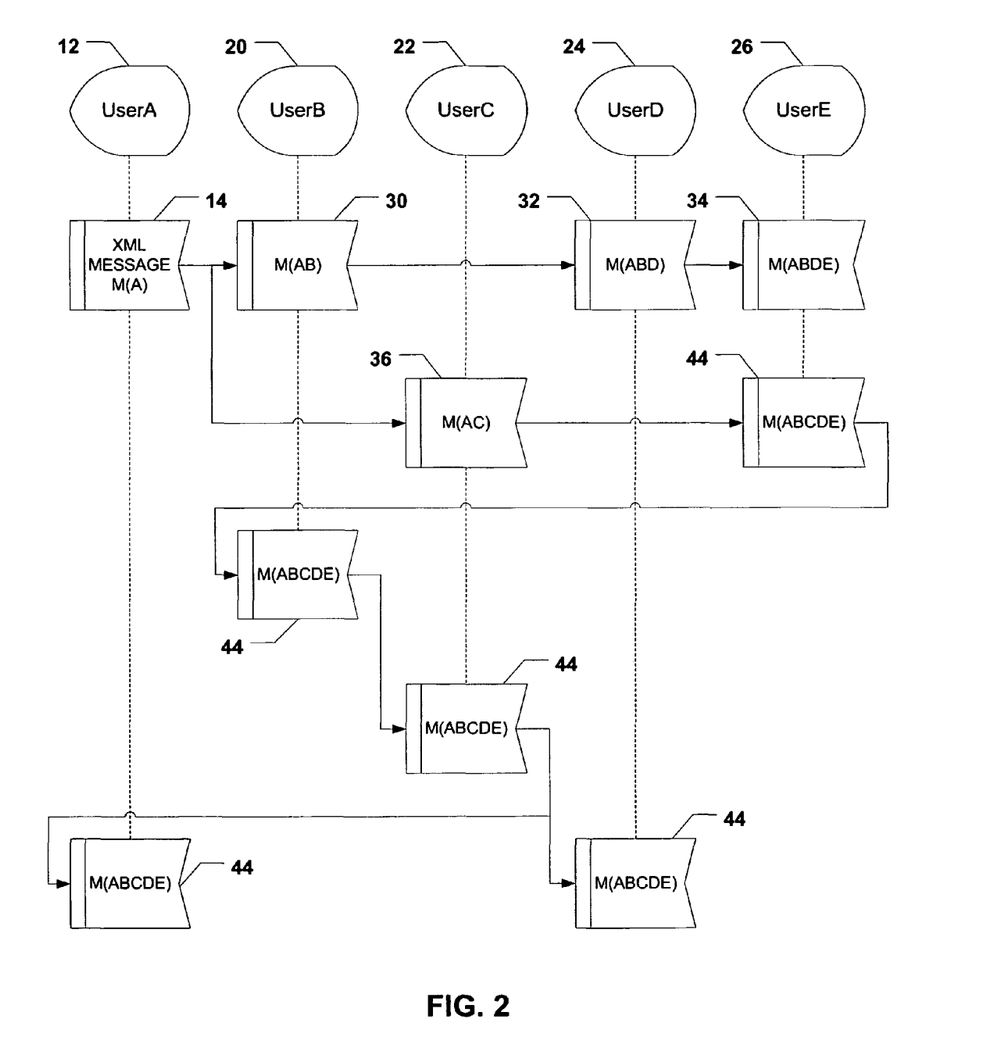
FIG. 2 is a block diagram illustrating an example of an N-way message-based divergence and convergence of a message document.

FIG. 1 is a flow chart of an embodiment of a method of performing N-way message-based divergence and convergence of message documents. To illustrate a particular example use of the method, FIG. 2 is a block diagram illustrating an example of an N-way message-based divergence and convergence of a message document.

As indicated by block 10, the method comprises creating an initial version of a message document. For purposes of illustration and example, consider UserA 12 creating an initial version, M(A) 14, of an XML message using a computing device such as a computer, a personal digital assistant, a telephone or a set-top box. The message document is stored on a computer-readable storage medium such as a memory of the device.

As indicated by block 16, the method comprises assigning a unique element identifier and a timestamp to each of a plurality of elements of the initial version of the message document. The unique element identifier provides a high level of granularity to elements of the message document. The timestamp is subsequently usable when merging two or more versions of the message.

As indicated by block 17, the method comprises distributing the version of the message document to at least one other user. The message document can be distributed by a computer network such as the Internet, an intranet or an extranet. The message document may be communicated via a wireline or a wireless network. The computing device may comprise a transmitter to output the version of the message document.

For purposes of illustration and example, consider a UserB 20, a UserC 22, a UserD 24 and a UserE 26 being allowed to make changes either to the initial version M(A) 14 or a variant thereof. Each of the UserA 12, the UserB 20, the UserC 22, the UserD 24 and the UserE 26 have computing devices (e.g. a computer, a PDA, a telephone or a set-top box) with a receiver to receive incoming versions of message documents and a transmitter to output version of message documents. The computing devices further comprise a processor, a display interface responsive to the processor, a display responsive to the display interface, one or more user input devices and a memory. The memory is to store a last version of the message documents. Also for purposes of illustration and example, consider the UserA 12 sending the initial version M(A) 14 to the UserB 20 and the UserC 22.

As indicated by block 18, the method comprises providing a user interface to enable a user to make one or more changes to a received version of the message document. Examples of changes include any combination of adding one or more elements, removing one or more elements, moving one or more elements, and other modifications to any version of the message document. By making the changes, the various users create versions of the message document that diverge from the initial version. Each of the computing devices comprises a display and one or more user input devices to provide the user interface.

The user interface may comprise a first control to cause the processor to merge the received version with the user's last version of the message document stored in the memory, a second control to cause the processor to replace the user's last version of the message document in the memory with the received version, and a third control to cause the processor to reject the received version to be rejected.

As indicated by block 28, the method comprises assigning a unique element identifier and a timestamp to each of one or more elements added to the version of the message document. The unique element identifier provides a high level of granularity to particular changes made to the message document. The timestamp is subsequently usable to selective apply the most recent changes when merging two or more versions.

To illustrate examples of the above acts, the UserB 20 and the UserC 22 are provided user interfaces to make changes to the initial version M(A) 14. The UserB 20 uses his/her computer, PDA, telephone or set-top box to make one or more changes to the initial version M(A) 14 to create a version M(AB) 30. The UserB 20 sends the version M(AB) 30 to the UserD 24. The UserD 24 uses his/her computer, PDA, telephone or set-top box to make one or more changes to the version M(AB) 30 to create a version M(ABD) 32. The UserD 24 sends the version M(ABD) 32 to the UserE 26. The UserE 26 uses his/her computer, PDA, telephone or set-top box to make one or more changes to the version M(ABD) 32 to create a version M(ABDE) 34.

The UserC 22 uses his/her computer, PDA, telephone or set-top box to make one or more changes to the initial version M(A) 14 to create a version M(AC) 34. The UserC 22 sends the version M(AC) 36 to the UserE 26.

The various versions of the message document can be represented by a tree or another type of graph. Each node of the tree represents a respective element of the version. Each link of the tree indicates that a first respective element is an element of a second respective element. The structure of the tree evolves as users build the message document by causing changes to be made to the versions.

As indicated by block 40, the method comprises receiving a command to merge or update multiple versions of the message document to form a merged version of the message document. The command may be entered by one of the users using his/her user interface. The user interface may comprise a user-selectable button or another control labeled as "update" or "merge". Users can initiate the command by clicking on or otherwise selecting the user-selectable button or other control. In contrast to previous acts that caused divergence of the versions, the command to merge or update is made to converge two or more of the versions.

As indicated by block 42, the method comprises merging the multiple versions of the document, based on the command, to create a merged version. The versions may be merged within a common context by determining how parts of two different MDs fit together based on their structure. The versions may be merged based on the unique element identifiers and the timestamps. Using the timestamps, the most recent changes may be applied when merging.

For purposes of illustration and example, consider the UserE 26 initiating the merge or update command to merge the version M(AC) 36 and the version M(ABDE) 34. In this example, the command causes the versions M(AC) 36 and M(ABDE) 34 to be merged to create a version M(ABCDE) 44.

As indicated by block 44, the method comprises distributing the merged version to one or more of the users. For purposes of illustration and example, the version M(ABCDE) 44 is distributed from the UserE 26 to the UserB 20, then from the UserB 20 to the UserC 22, and then from the UserC 22 to the UserA 12 and the UserD 24.

Thereafter, flow of the method is directed back to block 17 to distribute the merged version to one or more of the users, and block 18 to enable each of the users to make modifications to the merged version or any variant thereof. Thereafter, variants of the merged version can be merged to form another merged version. The process can be repeated one or more times.

Figure 3A:
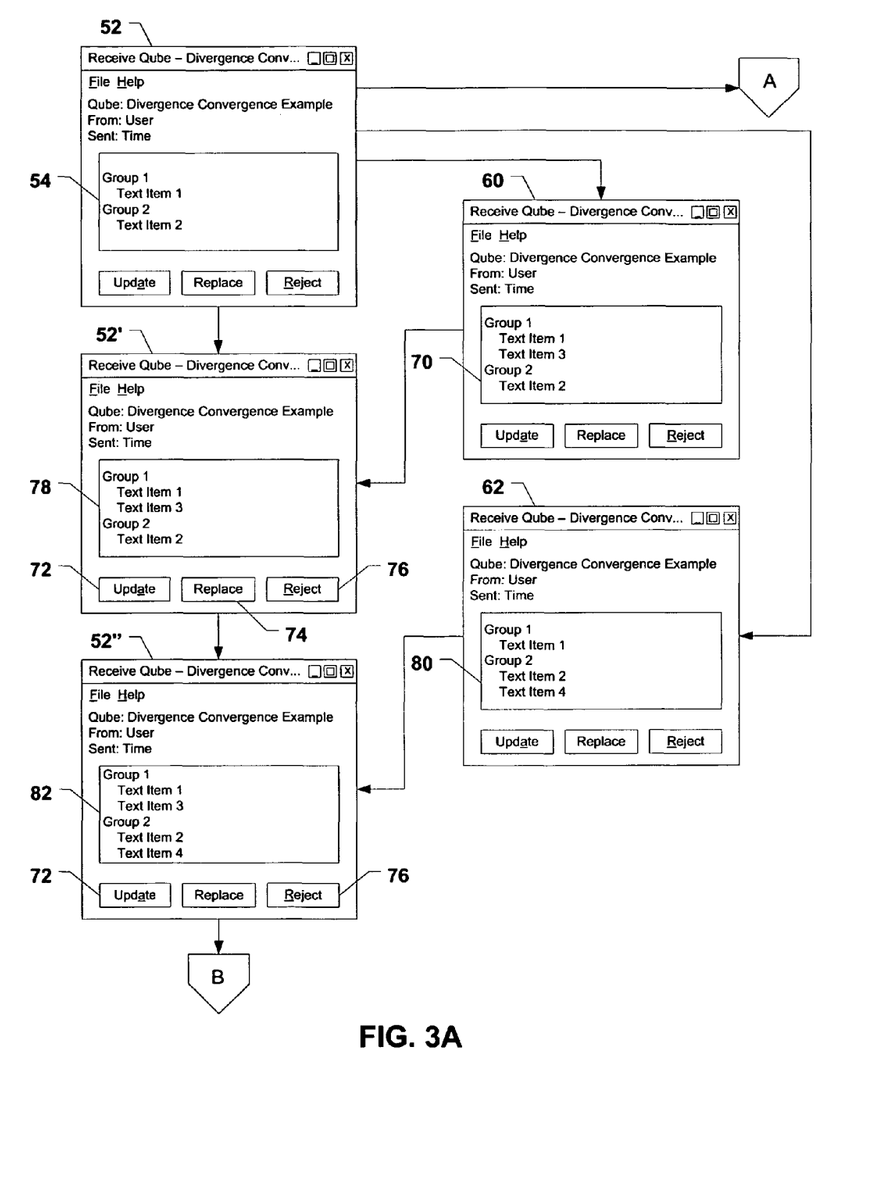
FIG. 3A and FIG. 3B illustrate another example of an N-way message-based divergence and convergence of a message document.
Figure 3B:
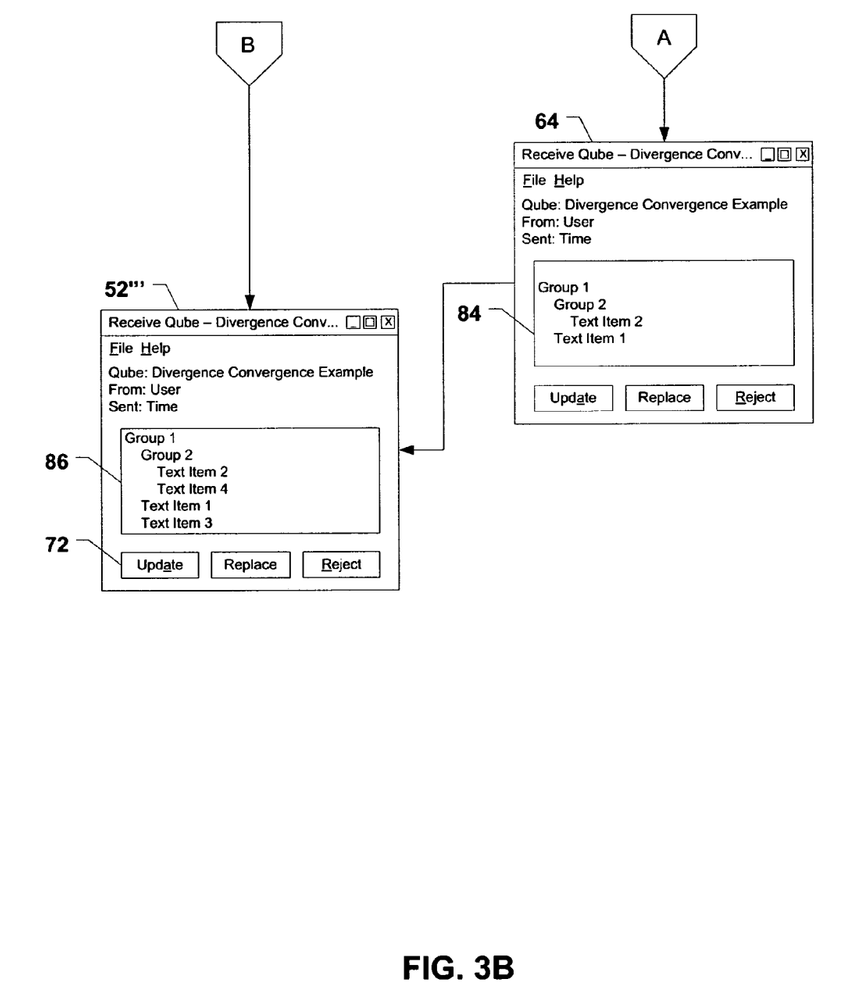

FIG. 3A and FIG. 3B illustrate another example of an N-way message-based divergence and convergence of a message document. This example illustrates an embodiment of the user interface at each user's computer, PDA, telephone or set-top box.

Consider a user interface 52 being provided to the UserA 12. The user interface 52 displays a hierarchical view 54 of elements of a first version of the message document. The first version comprises, in order, a first group which comprises a first text item, and a second group which comprises a second text item. In the first version, the second group is not an element of the first group, and the first group is not an element of the first group.

Consider the UserA 12 sending the first version to the UserB 20, the UserC 22 and the UserD 24. The UserA 12 may send the first version either simultaneously, substantially simultaneously, or at substantially different times to the UserB 20, the UserC 22 and the UserD 24.

Upon receiving the first version, the UserB 20 is provided a user interface 60, the UserC 22 is provided a user interface 62, and the UserD 24 is provided a user interface 64. Each of the user interfaces 60, 62 and 64 enables its respective user to make changes to the first version.

Consider the UserB 20 adding a third text item to the first version to provide a second version of the message document. The third text item is added after the first text item and is included in the first group. The user interface 60 displays a hierarchical view 70 of elements of the second version. Consider the UserB 20 sending the second version to the UserA 12.

Upon receiving the second version, the UserA 12 is provided a user interface 52'. Each user interface, including the user interface 52', provides an update button 72, a replace button 74 and a reject button 76. The update button 72, when selected, causes the received version to be merged with the user's last version of the message document. The replace button 74, when selected, causes the received version to replace the user's last version of the message document. The reject button 76, when selected, causes the received version to be rejected, i.e. to not replace the user's last version with the received version.

Consider the UserA 12 selecting the update button 72. Based on the selection of the update button 72, the second version is merged with the first version to produce a third version of the message document. In this example, the third version is the same as the second version. The user interface 52' displays a hierarchical view 78 of elements of the third version.

Consider the UserC 22 adding a fourth text item to the first version to provide a fourth version of the message document. The fourth text item is added after the second text item and is included in the second group. The user interface 62 displays a hierarchical view 80 of elements of the fourth version. Consider the UserC 22 sending the fourth version to the UserA 12.

Upon receiving the fourth version, the UserA 12 is provided a user interface 52". The UserA 12 selects the update button 72 to cause the fourth version to be merged with the third version to produce a fifth version of the message document. The fifth version is consistent the changes made by both the UserB 20 and the UserC 22. Thus, the fifth version comprises, in order, a first group which comprises the first text item and the third text item, and a second group which comprises the second text item and the fourth text item. The user interface 52" displays a hierarchical view 82 of elements of the fifth version.

Consider the UserD 24 moving the second group in the first version to produce a sixth version of the message document. The second group is moved to a position within the first group and before the first text item. This modification may be performed either before or after the merge to produce the third version and the merge to produce the fifth version. The user interface 64 displays a hierarchical view 84 of elements of the sixth version. Consider the UserD 24 sending the sixth version to the UserA 12.

Upon receiving the sixth version, the UserA 12 is provided a user interface 52'''. The UserA 12 selects the update button 72 to cause the sixth version to be merged with the fifth version to produce a seventh version of the message document. In general, the seventh version is consistent with the changes made by the UserB 20, the UserC 22, and the UserD 24. In particular, the seventh version reflects the move of the second group by the UserD 24 while retaining the new contents provided by the UserB 20 and the UserC 22. Thus, the seventh version comprises, in order, a first group which comprises a second group of the second text item and the fourth text item, followed by the first text item and the third text item. The user interface 52''' displays a hierarchical view 86 of elements of the seventh version.

In general, the same seventh version will result regardless of the order that the UserB 20, the UserC 22 and the UserD 24 make changes send their changed versions back to the UserA 12.

Each user interface may display a name of the message document, a sender of the message document, and a time at which the message document was sent.

Figure 5:
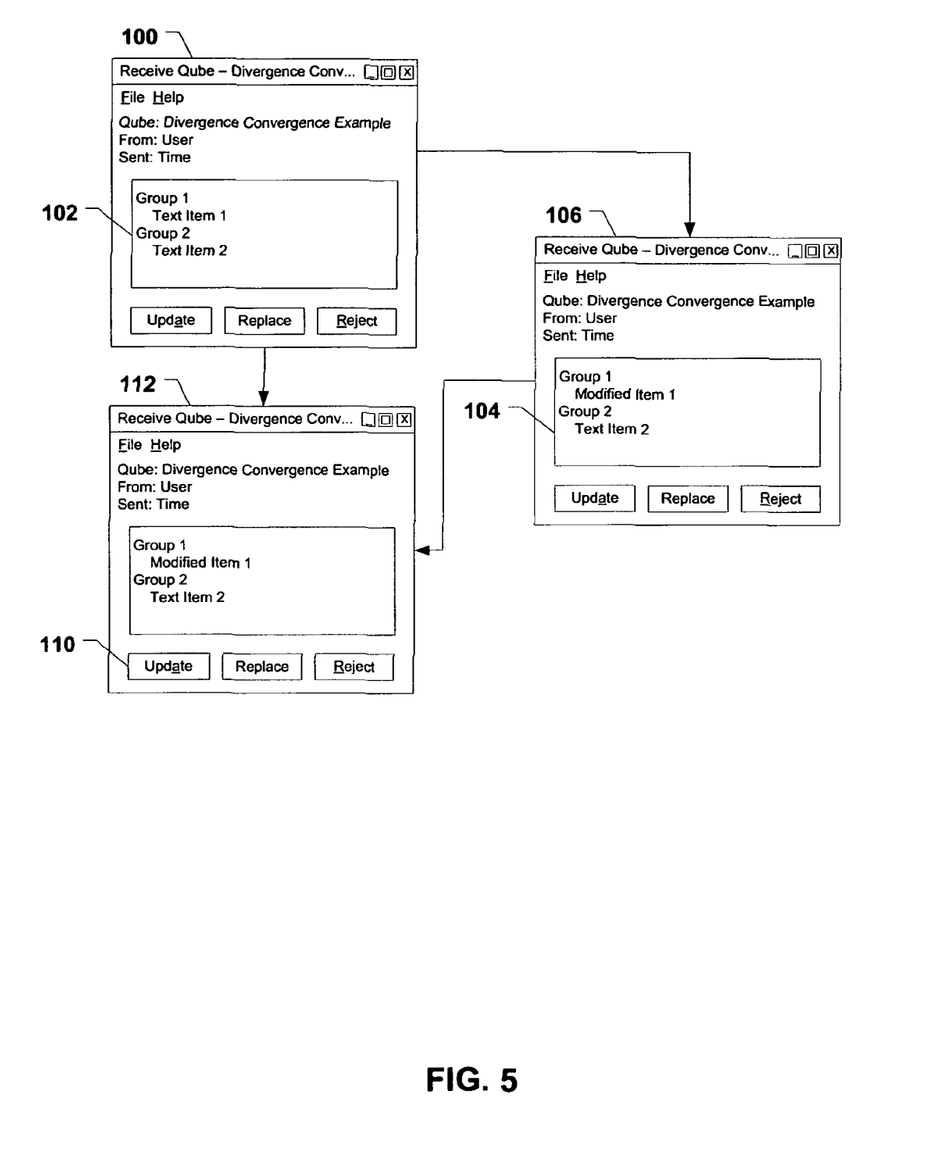
FIG. 5 illustrates an example of item editing in a message document.

FIG. 5 illustrates an example of item editing in a message document. A user interface 100 is provided to the UserA 12. The user interface 100 displays a hierarchical view 102 of elements of a first version of the message document. The first version comprises, in order, a first group which comprises a first text item, and a second group which comprises a second text item. In the first version, the second group is not an element of the first group, and the first group is not an element of the first group.

The UserA 12 sends the first version to the UserB 20. The UserB 20 modifies the first text item to produce a second version of the message document. A hierarchical view 104 of elements of the second version is displayed in a user interface 106 for the UserB 20. The UserB 20 sends the second version to the UserA 12. The UserA 12 selects an update button 110 in a user interface 112 to merge the second version with the first version.

Embodiments of N-way message-oriented merging enable new collaborative uses and behaviors. Using the embodiments, the users can collaborate on a meaning of each MD (e.g. its content, its form and its concrete links) to grow the MD into new and variant abstractions.

N-way message-oriented merging can be used in many practical applications. Examples of the practical applications include, but are not limited to, business-to-business (B2B) transactions, collaborative Web development, contract negotiations, project management, information gathering and collaborative research.

In B2B transactions, two or more participants can collaborate on an MD in parallel in order to fulfill an order that requires sub-contracts or sub-orders to be filled by multiple vendors.

In collaborative Web development, clients and developers can make multiple parallel changes to an HTML-rendered MD that was deployed as a Web site.

In contract negotiations, participants can collaborate on a contract document to work toward a final agreement that may be notarized.

In project management, project managers and members can share and extend project artifacts as a project progresses to allow specialization during the process and aggregation toward the end of the project.

In collaborative research, researchers can collaborate on a large problem (abstraction) and cause their results and/or findings to converge.

Although described herein for use with XML messages, alternative embodiments can be used to merge other representations of data having elements that can be specifically identified and tracked. Examples of the data include, but are not limited to, tagged program code that is parseable into a structure and identifiable by unique element names, hypertext markup language (HTML) pages, data from a database, a word processor file, and a custom-defined syntax. An example of a custom-defined syntax is as follows.

```
{element:documentroot id:1111 modified 119499601
    {element:item id:1234 modified:119499634 content:"hello"}
    {element:item id:1235 modified:119499637 content:"world"}
}
```

Figure 4:
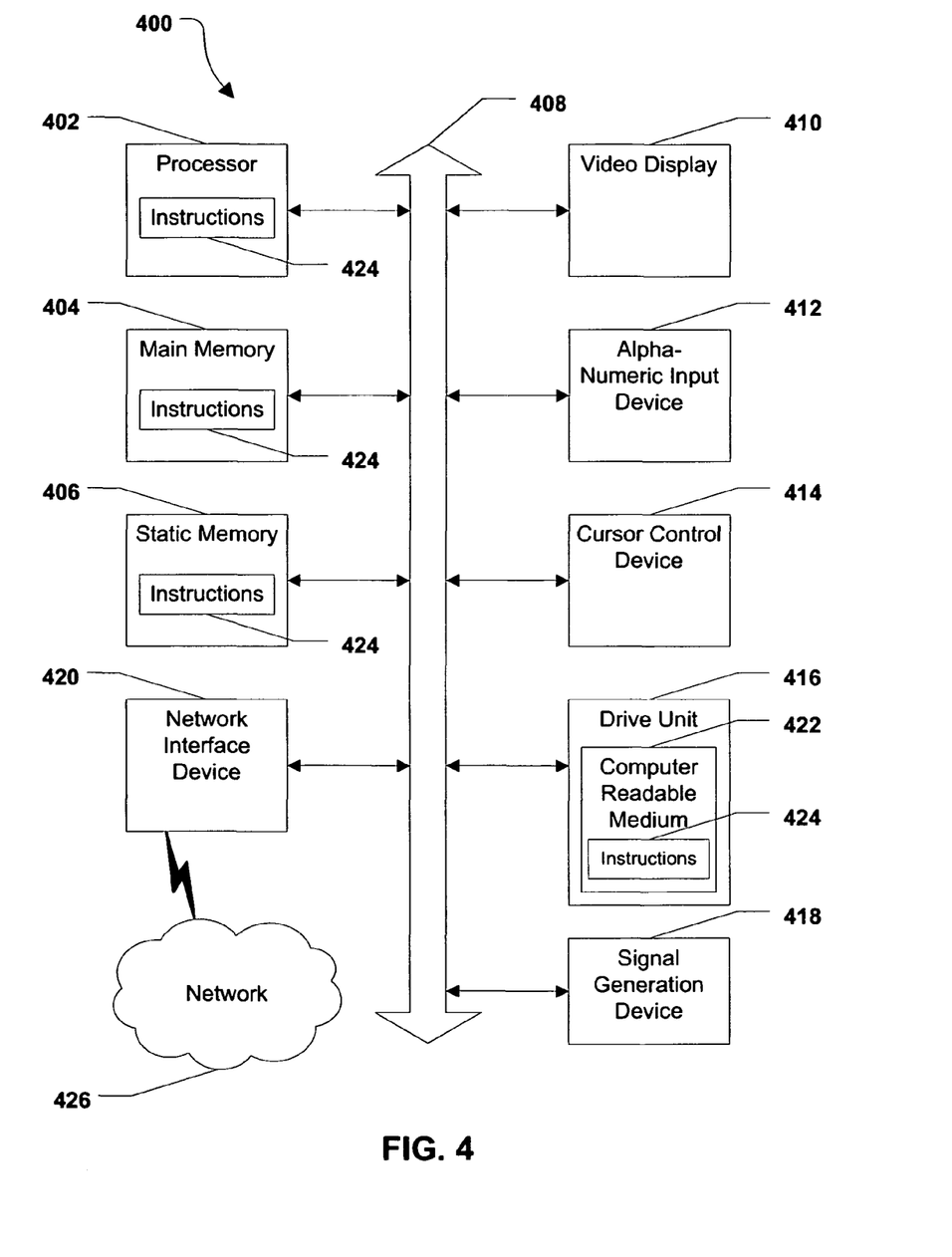
FIG. 4 is a block diagram of an illustrative embodiment of a general computer system.

Referring to FIG. 4, an illustrative embodiment of a general computer system is shown and is designated 400. The computer system 400 can include a set of instructions that can be executed to cause the computer system 400 to perform any one or more of the methods or computer based functions disclosed herein. The computer system 400 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 400 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 400 can be implemented using electronic devices that provide voice, video or data communication. Further, while a single computer system 400 is illustrated, the term "system" shall also be taken to include any collection of systems or sub-systems that individually or jointly execute a set, or multiple sets, of instructions to perform one or more computer functions.

As illustrated in FIG. 4, the computer system 400 may include a processor 402, e.g., a central processing unit (CPU), a graphics processing unit (GPU), or both. Moreover, the computer system 400 can include a main memory 404 and a static memory 406, that can communicate with each other via a bus 408. As shown, the computer system 400 may further include a video display unit 410, such as a liquid crystal display (LCD), an organic light emitting diode (OLED), a flat panel display, a solid state display, or a cathode ray tube (CRT). Additionally, the computer system 400 may include an input device 412, such as a keyboard, and a cursor control device 414, such as a mouse. The computer system 400 can also include a disk drive unit 416, a signal generation device 418, such as a speaker or remote control, and a network interface device 420.

In a particular embodiment, as depicted in FIG. 4, the disk drive unit 416 may include a computer-readable medium 422 in which one or more sets of instructions 424, e.g. software, can be embedded. Further, the instructions 424 may embody one or more of the methods or logic as described herein. In a particular embodiment, the instructions 424 may reside completely, or at least partially, within the main memory 404, the static memory 406, and/or within the processor 402 during execution by the computer system 400. The main memory 404 and the processor 402 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 424 or receives and executes instructions 424 responsive to a propagated signal, so that a device connected to a network 426 can communicate voice, video or data over the network 426. Further, the instructions 424 may be transmitted or received over the network 426 via the network interface device 420.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A computer-readable memory having computer-readable program code to cause a computing device to:
store a first version of an eXtensible Markup Language (XML) message including a plurality of XML elements, wherein the first version of the XML message includes an instance of a particular XML element having a first hierarchical parent;

receive a second version of the XML message, wherein the second version includes a second plurality of XML elements that are different from the plurality of XML elements of the first version, and wherein the second version includes another instance of the particular XML element having a second hierarchical parent that is different from the first hierarchical parent; and provide a user interface having a first control, a second control and a third control, a user selection of the first control to cause the second version to be automatically merged with the first version, without requiring further input, to produce a third version of the XML message, a user selection of the second control to cause the second version to replace the first version of the XML message, and a user selection of the third control to cause a rejection of the second version of the XML message, wherein the third version of the XML message includes a first XML element having a first associated timestamp and a second XML element having a second associated timestamp that is different from the first associated timestamp, wherein merging the second version with the first version includes performing a merge operation that produces the same third version of the XML message without regard to an order in which the first version of the XML message and the second version of the XML message are received, and wherein the third version of the XML message includes a single instance of the particular XML element having a third hierarchical parent that is different from at least one of the first hierarchical parent and the second hierarchical parent.

2. The computer-readable memory of claim 1 wherein the user interface includes a hierarchical view of the third version of the XML message.

3. The computer-readable memory of claim 1 wherein the computer-readable program code further causes the computing device to:

send the third version of the XML message to at least one other computing device.

4. The computer-readable memory of claim 1 wherein the first version is a merge of a fourth version and a fifth version of the XML message.

5. The computer-readable memory of claim 1 wherein the second version comprises at least one item added to the first version of the XML message.

6. The computer-readable memory of claim 1 wherein the second version comprises at least one item removed from the first version of the XML message.

7. The computer-readable memory of claim 4 wherein the second version comprises at least one item that has a first hierarchical position in the second version of the XML message and a second hierarchical position in the third version of the XML message.

8. The computer-readable memory of claim 1, wherein the first control comprises a first graphical button labeled as "update", the second control comprises a second graphical button labeled as "replace", and the third control comprises a third graphical button labeled as "reject".

9. A mobile phone comprising:

a memory to store a first version of an eXtensible Markup Language (XML) message having a plurality of XML elements at the mobile phone, wherein the first version of the XML message includes an instance of a particular XML element having a first hierarchical parent;

a receiver to receive a second version of the XML message at the mobile phone, wherein the second version includes a second plurality of XML elements that are different from the plurality of XML elements of the first version, and wherein the second version includes another instance of the particular XML element having a second hierarchical parent that is different from the first hierarchical parent;

a processor; and a display interface to provide a user interface having a first control, a second control and a third control, a user selection of the first control to cause the processor to automatically merge the second version with the first version, without requiring further input, to produce a third version of the XML message, a user selection of the second control to cause the processor to replace in the memory the first version with the second version of the XML message, and a user selection of the third control to cause the processor to cause a rejection of the second version of the XML message, wherein the third version of the XML message includes a first XML element having a first associated timestamp and a second XML element having a second associated timestamp that is different from the first associated timestamp, wherein merging the second version with the first version includes performing a merge operation that produces the same third version of the XML message without regard to an order in which the first version of the XML message is stored and the second version of the XML message is received, and wherein the third version of the XML message includes a single instance of the particular XML element having a third hierarchical parent that is different from at least one of the first hierarchical parent and the second hierarchical parent.

10. The mobile phone of claim 9 wherein the user interface includes a hierarchical view of the third version of the XML message.

11. The mobile phone of claim 9 further comprising:

a transmitter to send the third version of the XML message to at least one other computing device.

12. The mobile phone of claim 9 wherein the first version is a merge of a fourth version and a fifth version of the XML message.

13. The mobile phone of claim 9 wherein the second version comprises at least one item added to the first version of the XML message.

14. The mobile phone of claim 9 wherein the second version comprises at least one item removed from the first version of the XML message.

15. The mobile phone of claim 12 wherein the second version comprises at least one item that has a first hierarchical position in the second version of the XML message and a second hierarchical position in the third version of the XML message.

16. The mobile phone of claim 9 wherein the first control comprises a first graphical button labeled as "update", the second control comprises a second graphical button labeled as "replace", and the third control comprises a third graphical button labeled as "reject".

17. The mobile phone of claim 9 further comprising:

a display responsive to the display interface to display the user interface.

18. A computer-readable memory having computer-readable program code to cause a set-top box to:

store a first version of an eXtensible Markup Language (XML) message at the set-top box;

send the first version from the set-top box to a second computing device, a third computing device and a fourth computing device;

receive a second version of the XML message from the second computing device, the second version comprising a first item added to a first group in the first version;

receive a third version of the XML message from the third computing device, the third version comprising a second item added to a second group in the first version;

merge the second version with the third version of the XML message to produce a first merged version of the XML message at the set-top box that includes the first item and the second item being added to the first version, wherein the merger of the second version with the third version of the XML message occurs automatically in response to a user selection of a control and wherein the merger is performed without requiring further input, wherein the first merged version of the XML message includes a first XML element having a first associated timestamp and a second XML element having a second associated timestamp that is different from the first associated timestamp, wherein merging the second version with the third version includes performing a merge operation that produces the same first merged version of the XML message without regard to an order in which second version of the XML message and the third version of the XML message are received;

receive a fourth version of the XML message from the fourth computing device after producing the first merged version of the XML message, the fourth version comprising a move of the second group to a new hierarchical position within the first group from a previous hierarchical position outside the first group; and merge the fourth version with the first merged version to produce a second merged version of the XML message, the second merged version having a single instance of the second group, wherein the second group is moved to the new hierarchical position within the first group.

19. The computer-readable memory of claim 18 wherein the computer-readable program code causes the set-top box to provide a user interface that includes a hierarchical view of the second merged version of the XML message.

\* \* \* \* \*